United States Patent [19]

Melnick et al.

[11] 3,865,391
[45] Feb. 11, 1975

[54] SLED
[75] Inventors: Dennis M. Melnick; Mark Kubick, both of Baden, Pa.
[73] Assignee: Pallet Development Inc., Ambridge, Pa.
[22] Filed: Dec. 7, 1972
[21] Appl. No.: 313,194

[52] U.S. Cl. ............................................. 280/18
[51] Int. Cl. ........................................... B62b 13/06
[58] Field of Search ..... 280/18, 19, 28, 12 R, 12 H, 280/12 C, 12 A, 12 E, 12 B, 12 M; 9/310 B, 310 E; 114/62, 56

[56] References Cited
UNITED STATES PATENTS
2,382,335  8/1945  Ruhme .......................... 280/12 H
3,191,200  6/1965  Fournillier ...................... 9/310 E
3,288,100  11/1966  Cox .................................... 114/62
3,380,090  4/1968  Kenmuir ........................ 280/12 R
3,384,910  5/1968  Heston, Jr. ...................... 9/310 B
D201,815  8/1965  Greenberg .................... 280/18 X FOREIGN PATENTS OR APPLICATIONS
116,660  4/1969  Norway ............................... 280/18
300,636  8/1954  Switzerland ..................... 280/12 A
1,321,052  2/1963  France ............................. 280/12 B Primary Examiner—David Schonberg
Assistant Examiner—Michael J. Forman
Attorney, Agent, or Firm—Howard E. Sandler

[57] ABSTRACT
A sled and more particularly a sled rotationally molded of resinlike material in a unitary construction having spaced upper and lower walls.

16 Claims, 4 Drawing Figures

PATENTED FEB 11 1975

3,865,391

SLED

Recreational gravity type snow sleds are presently of many alternate designs such as; flat wood, plastic or metal toboggans and elevated runner. Many of such sleds suffer from one or more of the following problems: harsh rough rides; runners require constant maintenance; relatively heavy weight; dangerous sharp edges; poor resistance to low temperatures; running surface must be maintained such as by waxing or the like; difficult steering; poor weight distribution onto the running surface for use in soft uncompacted snow; non-waterproof construction; and the like.

By means of the present invention which includes a sled rotationally molded or resinlike materials in a unitary construction having spaced upper and lower walls many of the above-mentioned problems are remedied or at least substantially alleviated. The spaced upper and lower walls permit an air cushion to be trapped therebetween which acts as a shock absorber to permit a smoother ride. Furthermore the rotational molding process results in unitary side walls thereby increasing the shock absorber effect by side wall flexure. Because the side walls are unitary there are no welded or glued joints which quite often precipitate problems on prior art sleds.

The sled of this invention additionally includes a unique catamaran type running surface which in addition to aiding steering, enables the sled to be utilized in almost any type snow condition. Still further the forward end of the sled is uniquely shaped to provide a snow plow type effect which aids the sled to more swiftly through uncompacted snow while simultaneously providing the rider with a more comfortable ride by diverting the plowed snow to the sides and bottom of the sled.

These and other objects and advantages of the present invention will become more readily apparent upon a reading of the following description and drawings.

Figure 1:
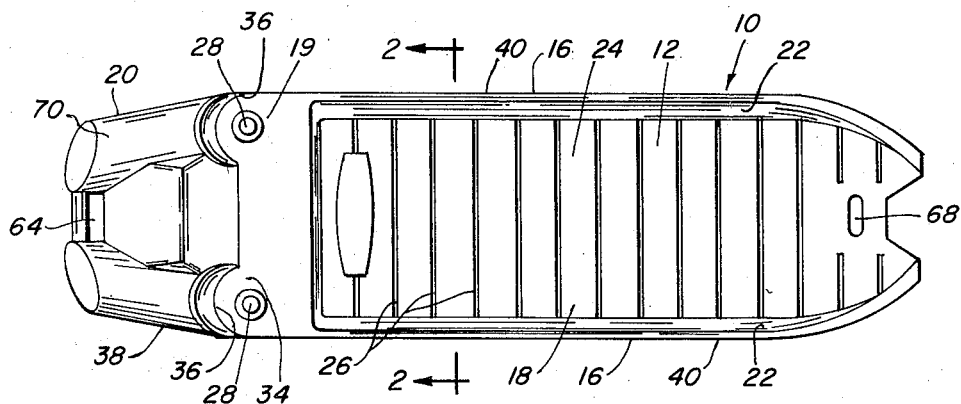
FIG. 1 is a plan view of a sled constructed in accordance with the principles of the present invention.
Figure 2:
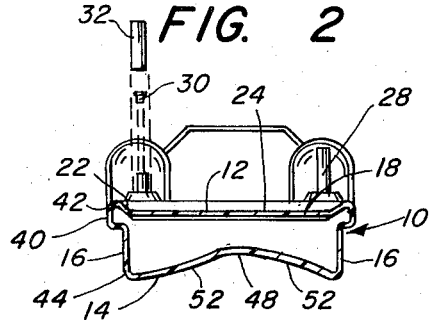
FIG. 2 is a cross-sectional view taken on lines 2—2 of FIG. 1.
Figure 3:
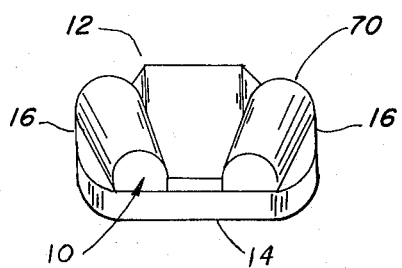
FIG. 3 is a front elevational view of the sled shown in FIG. 1.
Figure 4:
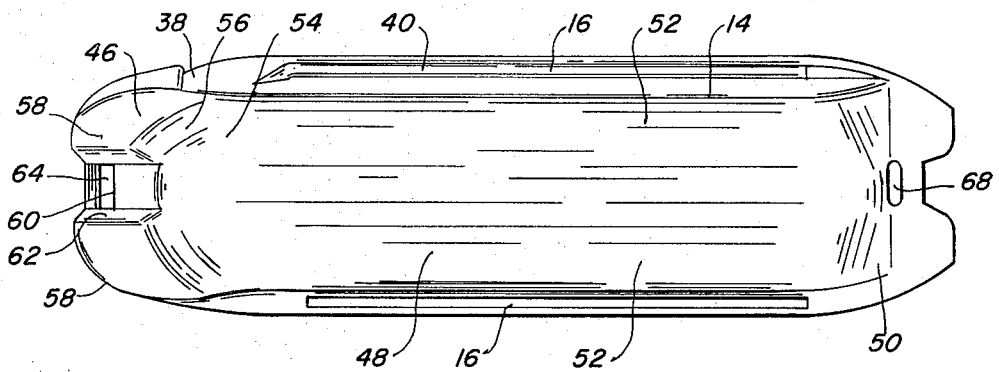
FIG. 4 is a bottom view of the sled shown in FIG. 1.

An elongated sled, generally indicated at 10, and constructed according to the principles of this invention is rotationally molded of resinlike material in a unitary construction and comprises spaced upper and bottom walls 12 and 14, respectively, and peripheral or side walls 16. Upper wall 12 includes a seating portion 18, a forward plow portion 20 and a forward hand grip portion 19 located axially intermediate portion 18 and 20. As shown, portion 20 is elevated upwardly with respect to portion 18 and 19.

Seating portion 18 includes peripheral gripping rims 22 extending longitudinally along each side thereof. The transverse extent of rims 22 are formed by portion 18 sloping downwardly from the respective sides thereof and inwardly towards the longitudinal axis of sled 10. The innermost extent or rims 22 terminate at the main seating section 24 of seating portion 18. As shown the main seating section 24 includes a plurality of longitudinally spaced grooves 26 therein which extend laterally across the entire extent of seating section 24. Grooves 26 aid in strengthening the main seating section 24 and also to increase the frictional resistance between the rider and sled 10.

Forward hand grip portion 19 includes a pair of transversely spaced upwardly extending flexible posts 28. The posts 28 are unitarily molded with top wall 12. Inasmuch as the rotational molding process requires blow holes each of the post 28 are open at the upper end thereof. To insure the water-tightness of sled 10 the open ends 28 are suitably sealed such as by plugs 30. In use the rider may grip the posts 28 to obtain a secure hold on the sled. Also gripping of the posts 28 will be of some aid to the rider in maneuvering the sled which is directed by shifting of body weight and foot control if desired. The posts 28 are flexible for comfort and safety of the rider. Posts 28 may be molded with grip grooves therein or as shown, grip type post covers 32 may be slidably inserted over each post 28.

The foward end of grip portion 19 terminates at the rear upwardly extending wall 34 of plow portion 20. Wall 34 is formed with forwardly projecting groove portions 36 adjacent each post 28. Such groove portions 36 provide ample room between wall 34 and posts 28 to enable a rider to comfortably obtain a firm grip on posts 28.

Side walls 16 comprise forward and rear portions 38 and 40, respectively.

The rear portion 40 of side walls 16 extend along the length of seating portion 18 and except for a rearwardmost portion thereof comprise an upper gripping section 42 and a lower runner side section 44. As shown the outermost surface of runner side section 44 is substantially vertical and is laterally inwardly offset from the substantially vertical outermost surface of gripping section 42. With a construction of gripping section 42 such as described hereinabove and shown in the figures it can readily be seen that the sled users can easily obtain a comfortable grip on the sides of the sled along the entire seating portion if so desired. Gripping rims 22 described hereinbefore additionally aid in the riders grip for it is intended that the ends of the riders fingers will engage the under surface of gripping section 42 while his thumb will engage the adjacent downwardly tapering upper surface of gripping rims 22.

Bottom wall 14 comprises: a forward runner portion 46; an intermediate main runner portion 48 which extends a substantial portion of the length of bottom wall 14; and a rear portion 50. The main runner portion 48 is generally of a symmetrical catamaran configuration formed from runner bearing sections 52 thereof which slope gradually inwardly from the sides of portion 48 towards the longitudinal axis of sled 10 and uwpardly towards top wall 12. Sections 52 extend upwardly to a smooth somewhat rounded transition therebetween at the mid-section of runner portion 48. With a configuration of runner portion 52 as described hereinabove snow flow is more or less rapidly channeled through the catamaran configuration thereby decreasing plowing and frictional resistance and thus increasing speed. The fact that the sled is formed of a resinlike material also aids in cutting down frictional resistance. The catamaran configuration additionally aids somewhat in steering the sled by leaning into the outermost area of section 52 in the direction the rider wishes to turn.

A forward transition section 54 of portion 48 tapers upwardly and forwardly to meet a rear transition section 56 of forward runner portion 46 to a smooth somewhat rounded transition. In addition to transition section 56 forward runner portion 46 includes the following sections which extend forwardly therefrom; laterally spaced wedge sections 58 and a snow chute section 60. The rearwardmost ends of wedge sections 58 terminate at an elevation substantially in alignment with a plane containing the bottommost extent of intermediate portion 48. From such rear termination point wedge sections 58 extend forwardly and slope upwardly towards top wall 12 to meet in a smooth transition with side walls 16 which wrap around the front of sled 10. With such a configuration of wedge sections 58 as described hereinabove snow forwardly of the main runner portion 48 is compressed by wedging action during the sled acceleration thereby decreasing resistance and increasing speed performance of sled 10. Furthermore the wedge sections 58 perform somewhat in a plowing manner to throw or direct the snow forwardly thereof downwardly towards the main runner portion 48 thereby increasing sled performance while simultaneously increasing the rider comfort by resulting in snow being directed downwardly away from the operators face.

The rearwardmost end of the snow chute section 60 terminates in a smooth transition with a curved plane containing the uppermost extent of the central transition area of sections 52. From such rear termination point chute section 60 extends forwardly and slopes upwardly towards top wall 12 to meet in a smooth transition with the forward wrap around portions of side walls 16. The upward slope of chute section 60 is much steeper than the upward slope of the wedge sections 58 described hereinabove thereby resulting in a gap 62 extending transversely between wedge sections 58 along the length of chute section 60. With a construction of chute section 60 as described hereinabove snow forwardly thereof will be thrown rearwardly towards the main runner portion 48 once again increasing sled performance. It is to be noted that the configuration of chute section 60 relieves the forward end of sled 10 from wedging action such as experienced across wedge sections 58 in the middle portion thereof. Spaced rearwardly from the forward end of chute section 60 a forward hand or rope hold 64 is integrally formed. Hold 64 extends intermediate the innermost sides of wedge sections 60 and between the top and bottom walls 12 and 14, respectively.

The rear portion 50 of bottom wall 14 extends rearwardly from a smooth transition with the rearwardmost end of the main portion 48 and tapers uniformally upwardly therefrom towards top wall 12 to meet in a smooth transition with rearward wrap around portions of side walls 16. The rearward section of portion 50 is shown as being formed with a central forwardly extending gap 66 therein. Gap 66 provides means of an efficient channeled passage of snow from the main runner portion 48. Spaced forwardly from the gap 66 a rear hand or rope hold 68 is integrally formed in rear portion 50. It is to be noted that both forward and rear holds 64 and 68, respectively, are located at an elevation upwardly from the main running surfaces of the sled 10 thereby providing minimal interference with snow passage in the event ropes or the like are tied therein. In addition, the utilization of both forward and rear holds 64 and 68 provide means for readily arranging a "sled train" in the event a group of riders on a plurality of sleds wish to join in common mayhem.

The plow portion 20 of top wall 12 includes a section generally indicated at 70 which extends forwardly from a smooth transition at the rearward end thereof with wall 34 and slopes downwardly therefrom towards bottom wall 14 and inwardly towards the centerline of sled 10 to meet in a transition with the forward wrap around portions of side walls 16. The configuration of section 70 aids in plowing snow forwardly thereof and throwing the snow to the side of sled thereby once again increasing speed while simultaneously providing greater rider comfort.

It is to be understood that various modifications can be made to the particular embodiment of the invention as described hereinabove without departing from the scope of invention herein which is defined by the claims set forth hereinafter.

What is claimed is:

1. An elongated recreational gravity type sled formed of resinlike material comprising: a surface engaging lower wall; a passenger carrying upper wall overlying said lower wall and spaced therefrom; a peripheral wall extending around the peripheries of said upper and lower wall to support said peripheries; said peripheral wall being integrally formed with said upper and lower walls and being substantially the only support therebetween to form a unitary and substantially hollow sled; said upper wall including at least the major longitudinal extent thereof formed as a generally planar seating surface to receive passengers thereon; and said upper wall additionally includes a plow portion formed with and extending forwardly of said major longitudinal extent of said upper wall, said plow portion including a rear upwardly projecting wall section and a forward plow section which extends forwardly from said wall section and slopes downwardly and inwardly therefrom.

2. An elongated recreational gravity type sled formed of resinlike material comprising: a surface engaging lower wall; a passenger carrying upper wall overlying said lower wall and spaced therefrom; a peripheral wall extending around the peripheries of said upper and lower wall to support said peripheries; said peripheral wall being integrally formed with said upper and lower walls and being substantially the only support therebetween to form a unitary and substantially hollow sled; said upper wall including at least the major longitudinal extent thereof formed as a generally planar seating surface to receive passengers thereon; and a transversely spaced pair of flexible hand grip posts which extend upwardly from said upper wall at a location forwardly of said major longitudinal extent of said upper wall and which are integrally formed with said upper wall.

3. A sled as described in claim 2 wherein said hand grip posts include openings at the upper ends thereof which provide communication between the exterior and hollow interior of the sled.

4. A sled as described in claim 3 wherein said openings include plugs received therewithin and additionally including sleeve gripping means received over said hand grip posts.

5. An elongated recreational gravity type sled formed of resinlike material comprising: a surface engaging lower wall; a passenger carrying upper wall overlying said lower wall and spaced therefrom; a peripheral wall extending around the peripheries of said upper and lower walls to support said peripheries; said peripheral all being integrally formed with said upper and lower walls and being substantially the only support therebetween to form a unitary and substantially hollow sled; said lower wall having at least the major longitudinal surface engaging extent thereof formed in a downwardly open generally "U" shaped catamaran type configuration; and said lower wall including still another portion thereof which extends rearwardly and slopes upwardly from said major longitudinal extent.

6. A sled as specified in claim 5 wherein the wall thickness of all of said walls is substantially uniform having a thickness variance therebetween of no more than ten percent (10 percent).

7. A sled as described in claim 5 with said still another portion being formed to provide a channeling and discharge chute for snow passing from said major longitudinal surface engaging extend of said lower wall.

8. A sled as described in claim 5 additionally including peripherally walled integrally formed tow holds inwardly adjacent the forward and rear ends of such a sled.

9. A sled as described in claim 8 wherein said tow holds are formed at an elevation no lower than adjacent the uppermost running surface of said lower wall.

10. A sled as described in claim 5 wherein at least the major longitudinal extent of said upper wall is formed as a generally planar seating surface to receive passangers thereon.

11. A sled as described in claim 10 wherein said major longitudinal extent of said upper wall includes a plurality of longitudinally spaced transversely extending downwardly depressed grooves formed therein which increase frictional resistance between passangers and said major longitudinal extent of said upper wall.

12. A sled as described in claim 10 wherein at least a major portion of the longitudinal peripheries of said major longitudinal extent of said upper wall and said peripheral walls adjacent to said major portion of said longitudinal peripheries are formed to provide continuously extending passenger hand holds to enable the passenger to readily grip the sides of the sled.

13. A sled as specified in claim 5 wherein at least a portion of said lower wall depending forwardly from said major longitudinal surface engaging extent extends forwardly and slopes upwardly from said major longitudinal surface engaging extent, said portion of said lower wall operative during use of such a sled to provide a wedging action to snow passing thereunder.

14. A sled as specified in claim 13 wherein said at least a portion of said lower wall comprises a transversely spaced identical pair of lower wall sections which extend forwardly and slope upwardly from said major longitudinal surface engaging extent.

15. A sled as specified in claim 14 wherein another portion of said lower wall depending forwardly from said major longitudinal surface engaging extent extends forwardly and slopes upwardly from said major longitudinal surface engaging extent the upward slope of said another portion being steeper than said lower wall sections.

16. A sled as specified in claim 15 wherein said another portion is located transversely intermediate said lower wall sections.

* * * * *